US012764127B2

(12) United States Patent
Gerards et al.

(10) Patent No.: US 12,764,127 B2
(45) Date of Patent: Oct. 13, 2026

(54) SYSTEMS AND METHODS FOR FACILITATING DETECTION OF A SECURITY EVENT ASSOCIATED WITH AN IoT DEVICE

(71) Applicants: Jan-Robin Gerards, New York, NY (US); Dustin Goodwin, Wheat Bridge, CO (US)

(72) Inventors: Jan-Robin Gerards, New York, NY (US); Dustin Goodwin, Wheat Bridge, CO (US)

( * ) Notice: Subject to any disclaimer, the term of this patent is extended or adjusted under 35 U.S.C. 154(b) by 0 days.

(21) Appl. No.: 18/239,129

(22) Filed: Aug. 29, 2023

(65) Prior Publication Data

US 2024/0031381 A1 Jan. 25, 2024

Related U.S. Application Data

(63) Continuation of application No. 16/679,936, filed on Nov. 11, 2019, now Pat. No. 11,785,021.

(51) Int. Cl.

| | |
|---|---|
| ***H04L 9/40*** | (2022.01) |
| ***G06F 21/55*** | (2013.01) |
| ***G16Y 20/20*** | (2020.01) |
| ***G16Y 30/10*** | (2020.01) |
| ***H04L 9/06*** | (2006.01) |
| *H04L 9/00* | (2022.01) |

(52) U.S. Cl.

CPC ........ *H04L 63/1416* (2013.01); *G06F 21/554* (2013.01); *G16Y 20/20* (2020.01); *G16Y 30/10* (2020.01); *H04L 9/0618* (2013.01); *H04L 9/0643* (2013.01); *H04L 9/50* (2022.05)

(58) Field of Classification Search

CPC . H04L 63/1416; H04L 9/0618; H04L 9/0643; H04L 9/50; H04L 9/3239; G06F 21/554

See application file for complete search history.

(56) References Cited

U.S. PATENT DOCUMENTS

| | | | | |
|---|---|---|---|---|
| 9,542,213 | B2 * | 1/2017 | Richard | G06F 11/3438 |
| 10,826,684 | B1 * | 11/2020 | Winter | H04L 9/3239 |
| 2005/0073389 | A1 * | 4/2005 | Chandley | G06F 21/554 340/5.31 |

(Continued)

*Primary Examiner* — Ali S Abyaneh

(74) *Attorney, Agent, or Firm* — Dhiraj Jindal; PATENT YOGI LLC

(57) ABSTRACT

Disclosed herein is a method of detecting a security event associated with an IoT device configured to store data on a primary blockchain, in accordance with some embodiments. Accordingly, the method may include receiving, using a communication device, actual operational data associated with the IoT device. Further, the method may include retrieving, using a storage device, standard operational data associated with the IoT device. Further, the method may include analyzing, using a processing device, each of the actual operational data and the standard operational data. Further, the method may include detecting, using the processing device, the security event based on the analyzing. Further, the method may include generating, using the processing device, a notification based on the detecting. Further, the method may include transmitting, using the communication device, the notification to at least one user device associated with the IoT device.

15 Claims, 10 Drawing Sheets

(56) References Cited

U.S. PATENT DOCUMENTS

| | | | | |
|---|---|---|---|---|
| 2013/0097669 | A1* | 4/2013 | Davis | G06F 21/316 726/3 |
| 2015/0096023 | A1* | 4/2015 | Mesdaq | H04L 63/1416 726/23 |
| 2016/0285897 | A1* | 9/2016 | Gantman | G06N 20/00 |
| 2018/0040172 | A1* | 2/2018 | Funk | G07C 5/008 |
| 2018/0309651 | A1* | 10/2018 | Kim | G06F 21/552 |
| 2019/0156026 | A1* | 5/2019 | Liao | G06F 21/52 |
| 2019/0207957 | A1* | 7/2019 | Espinosa | G06F 8/65 |
| 2019/0319861 | A1* | 10/2019 | Pan | H04L 9/0637 |
| 2020/0236086 | A1* | 7/2020 | Patil | G06F 9/45558 |
| 2020/0236127 | A1* | 7/2020 | Webb | H04L 63/20 |
| 2020/0374304 | A1* | 11/2020 | Rodriguez Bravo | H04W 12/122 |
| 2021/0037050 | A1* | 2/2021 | Ree | H04L 63/1416 |
| 2021/0044563 | A1* | 2/2021 | Reyes | G06F 21/564 |

* cited by examiner

SYSTEMS AND METHODS FOR FACILITATING DETECTION OF A SECURITY EVENT ASSOCIATED WITH AN IoT DEVICE

TECHNICAL FIELD OF THE INVENTION

Generally, the present disclosure relates to the field of data processing. More specifically, the present disclosure relates to systems and methods for facilitating detection of a security event associated with an IoT device.

BACKGROUND OF THE INVENTION

The field of data processing is technologically important to several industries, business organizations and/or individuals. In particular, the use of data processing is prevalent for detecting a security event associated with an IoT device. The security event associated with the IoT device may include tampering of the IoT, unauthorized access of IoT device, etc.

Existing techniques for detecting a security event associated with an IoT device are deficient with regard to several aspects. For instance, current technologies do not have the ability to detect a tampering event associated with the IoT device that may be connected to a blockchain. Furthermore, current technologies do not have the ability to resolve the tampering event associated with the IoT device. Moreover, current technologies do not use a distributed ledger aspect of a blockchain to create a system of verification for the IoT device and identify the security event associated with the IoT device connected to the blockchain.

Therefore, there is a need for improved systems and methods for facilitating detection of a security event associated with an IoT device that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of detecting a security event associated with an IoT device configured to store data on a primary blockchain, in accordance with some embodiments. Accordingly, the method may include a step of receiving, using a communication device, actual operational data associated with the IoT device. Further, the method may include a step of retrieving, using a storage device, standard operational data associated with the IoT device. Further, the method may include a step of analyzing, using a processing device, each of the actual operational data and the standard operational data. Further, the method may include a step of detecting, using the processing device, the security event based on the analyzing. Further, the method may include a step of generating, using the processing device, a notification based on the detecting. Further, the method may include a step of transmitting, using the communication device, the notification to at least one user device associated with the IoT device.

Further, disclosed herein is a system (IoT device) configured for detecting a security event associated with an IoT device, in accordance with some embodiments. Accordingly, the IoT device may include a processing device configured for receiving actual operational data associated with the IoT device. Further, the processing device may be configured for receiving standard operational data associated with the IoT device. Further, the processing device may be configured for analyzing the actual operational data and the standard operational data. Further, the processing device may be configured for detecting the security event based on the analyzing. Further, the processing device may be configured for generating a notification based on the detecting. Further, the IoT device may include a communication device. Further, the communication device may be configured for transmitting IoT data generated by the IoT device to a primary blockchain device configured to store the IoT data on a primary blockchain. Further, the communication device may be configured for transmitting the notification to at least one user device associated with the IoT device. Further, the IoT device may include a storage device configured for storing at least the standard operational data.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE DRAWINGS

Figure 1:
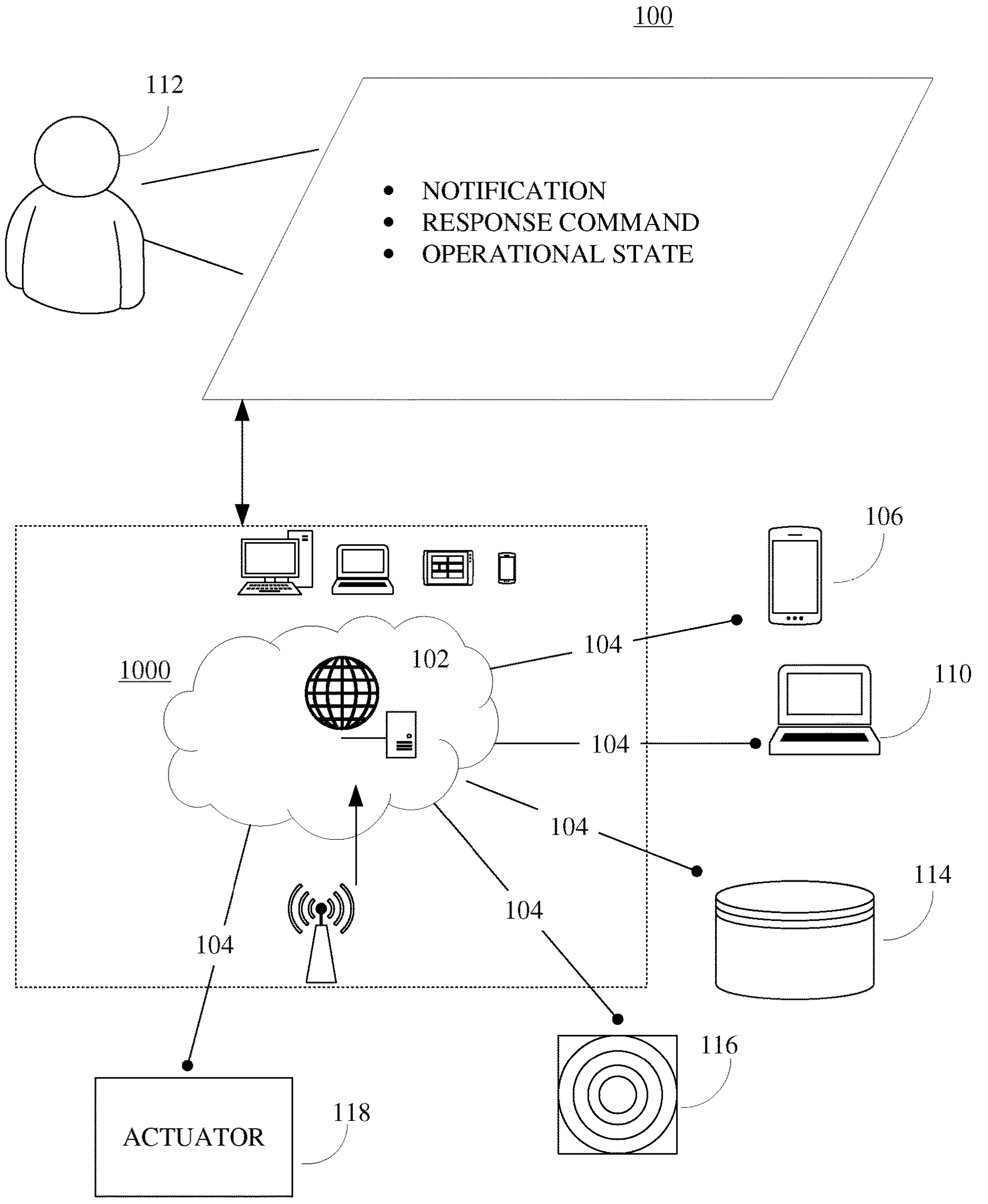
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of systems and methods for facilitating detection of a security event associated with an IoT device, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure may describe methods that may allow the integration between an IoT device that may be connected to a blockchain. Further, the IoT device may act as a hardware oracle node and/or a physical device connected to the blockchain that may be used to validate smart contracts in some way. Further, the method may be used for peer to peer IoT devices that may be connected to a blockchain.

Further, the present disclosure may describe the hardware verification systems. Further, the hardware verification system may provide a blockchain system with the ability to determine if an Oracle Node (IoT device) may be tampered and deal with the Oracle Node in an automated fashion. Further, the present disclosure may utilize the distributed ledger aspect of a blockchain system along with the ideas of hashes to create a system of verification. Further, the hardware verification system may be attached to a hardware device. Further, the hardware verification system may allow the blockchain system to determine whether the hardware device has been tampered with or not. Further, an oracle, in the context of blockchains and smart contracts, may be an agent that may find and verifies real-world occurrences and submits the information to a blockchain to be used by smart contracts. Further, an oracle may be a data feed that may be provided by third party service. Further, the oracle may be designed for use in smart contracts on the blockchain.

Further, the hardware verification system may be attached to a hardware device. Further, the hardware verification system may generate unique keys associated with the hardware device. Further, the hardware verification system may alter the unique keys of the hardware device if any tampering may be done within the normal threshold of the hardware verification system. Further, the hardware verification system may alter the unique keys of the hardware device that a ledger may be expecting. Further, the unique keys may be written as a part of a hash of each entry into a blockchain such that when the hardware device gets tampered with the unique key of the hardware device changes. Further, the mismatch of the unique keys in the blockchain may be identified. Further, the mismatch may be an indication that the entry may be tampered and further, the hardware device that produces that entry may be flagged for auditing. Further, there may be a master list that may include a list of all hardware devices and the corresponding unique encrypted keys that may be copied to all the nodes of a network. Further, the master list may be provided to all the nodes of the network so that one person could alter the master list to match a tampered hardware device.

Further, the hardware device may show that the hardware device may be tampered with by going offline. Further, if the hardware device may go offline the hash associated with the hardware device may change. Further, if the normal operating parameter of the hardware device change then the unique sequence and/or patter associated with the hardware device may change further changing the unique hash associated with the hardware device.

The present disclosure may include all IoT to IoT interactions as well as IoT to blockchain interactions. This would solve the issue around the Oracle node problem, owing to the interaction between blockchain and blockchain IoT hardware.

Further, the hardware verification system may take advantage of the fundamental mechanism of the blockchain. Further, the hardware verification system may use the fundamental mechanism of the blockchain such as hashes, and distributed ledgers with keys, to ensure that anyone that may tamper with a hardware device on the blockchain, could be allowed to do so. Further, the hardware device may now change the hash associated with the hardware device in a way that may be not what the blockchain system may expect and therefore that oracle node or hardware device may be blacklisted. Further, the hardware device may remain blacklisted until a third party that may verify that the hardware device may be working properly and recalibrate the hardware device to be accepted back into the overall blockchain system. Further, the hashes in combination with the being able to look at a unique sequence and or pattern of data points that may be generated by the hardware device while the hardware device may be operating. Further, if any tampering may happen to the hardware device, the hardware device may change the pattern and/or sequence of characters that may be produced by the hardware device. Further, the change in the pattern and/or sequence of characters may further change the resulting hash that may be sent to the blockchain to be accessed by the blockchain. Further, the change in the hash associated with the hardware device may let all hardware devices know that the hardware device may have been tampered with.

FIG. 1 is an illustration of an online platform 100 consistent with various embodiments of the present disclosure. By way of non-limiting example, the online platform 100 for facilitating detection of a security event associated with an IoT device may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114, actuators 118, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1000.

Figure 2:
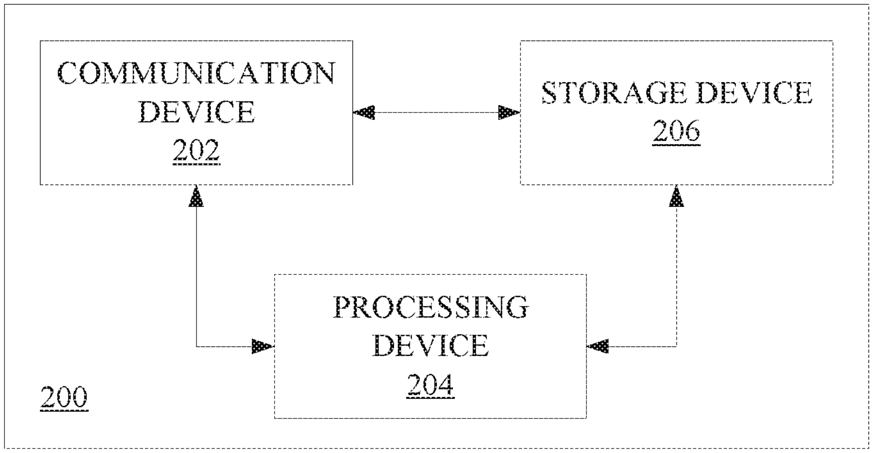
FIG. 2 is a block diagram of a system (IoT device) configured for detecting a security event associated with an IoT device, in accordance with some embodiments.

FIG. 2 is a block diagram of a system (IoT device) 200 configured for detecting a security event associated with an IoT device 200, in accordance with some embodiments.

Accordingly, the IoT device 200 may include a processing device 204, a communication device 202, and a storage device 206.

Further, the processing device 204 may be configured for receiving actual operational data associated with the IoT device 200. Further, the actual operational data, in an instance, may be associated with the actual operation of the IoT device 200. Further, the processing device 204 may be configured for receiving standard operational data associated with the IoT device 200. Further, the standard operational data, in an instance, may be associated with the standard operation of the IoT device 200. Further, the processing device 204 may be configured for analyzing the actual operational data and the standard operational data. Further, the analyzing, in an instance, may include at least one analyzing method. Further, the at least one analyzing method may be used to analyze the actual operational data with respect to the standard operational data. Further, the analyzing method may include comparing, interpreting, extrapolating, statistical analyzing, machine learning, etc. Further, the processing device 204 may be configured for detecting the security event based on the analyzing. Further, the security event may correspond to at least one tampering activity associated with the IoT device 200. Further, the at least one tampering activity may include a breach, a malfunction, unauthorized access, etc. Further, the at least one tampering activity may change the actual operation data associated with the actual operation of the IoT device 200. Further, the security event may include at least one of a discrepancy, an anomaly, an abnormality, etc. associated with each of the actual operational data with respect to the standard operational data. Further, the processing device 204 may be configured for generating a notification based on the detecting. Further, the notification, in an instance, may include the security event and particulars of the security event. Further, the particulars of the security event may include the time of the security event, the date of the security event, the severity of the security event, and so on. Further, in an embodiment, the actual operational data may include at least one of actual hardware configuration data and actual software configuration data. Further, the actual hardware configuration data may include a plurality of values corresponding to a plurality of variables associated with an actual hardware configuration of the IoT device 200. Further, the actual software configuration data may include a plurality of values corresponding to a plurality of variables associated with an actual software configuration of the IoT device 200. Further, the standard operational data may include at least one of standard hardware configuration data and standard software configuration data. Further, the standard hardware configuration data may include a plurality of values corresponding to a plurality of variables associated with a standard hardware configuration of the IoT device 200. Further, the standard software configuration data may include a plurality of values corresponding to a plurality of variables associated with a standard hardware configuration of the IoT device 200. Further, in an embodiment, the processing device 204 may be configured to generate an actual hash based on the actual operational data. Further, the actual hash may be generated by using a hash algorithm. Further, the hash algorithm may be used to generate the actual hash based on the actual operational data. Further, in an embodiment, the processing device 204 may be configured to generate a standard hash based on the standard operational data. Further, the hash algorithm may be used to generate the standard hash based on the standard operational data. Further, the analyzing may include comparing the actual hash with the standard hash.

Figure 3:
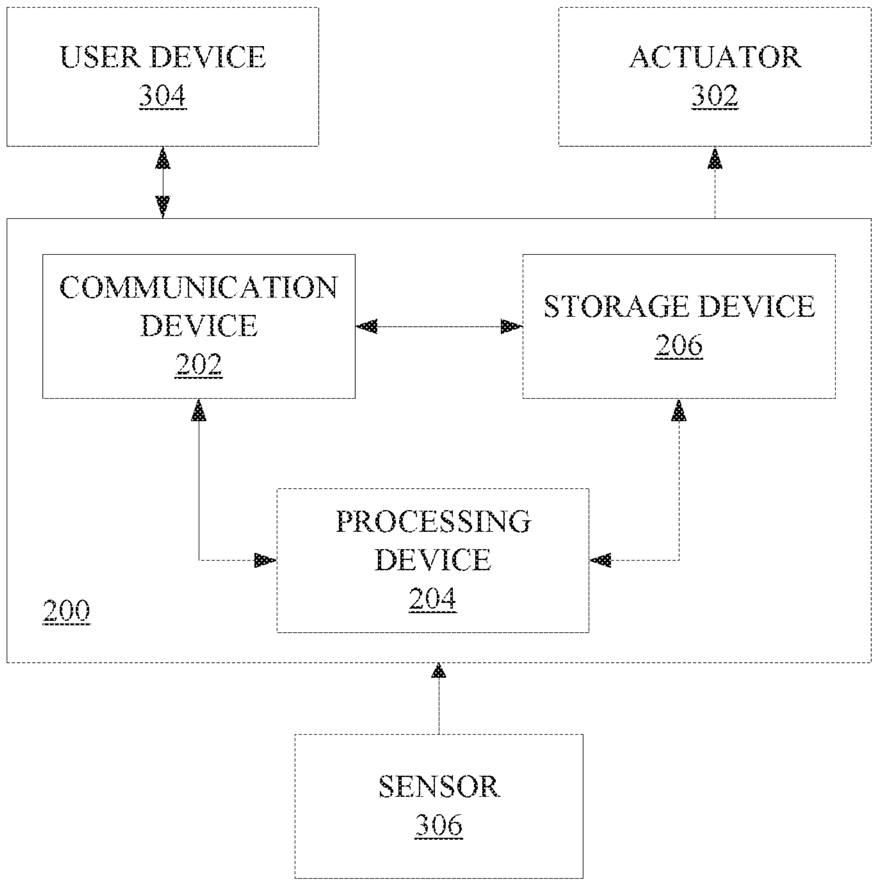
FIG. 3 is a block diagram of a system (IoT device) configured for detecting a security event associated with an IoT device, in accordance with some embodiments.

Further, the communication device 202 may be configured for transmitting IoT data generated by the IoT device 200 to a primary blockchain device configured to store the IoT data on a primary blockchain. Further, the IoT data may include any data that may be generated by the IoT device 200. Further, a blockchain device such as the primary blockchain device may include at least one computing device. Further, the at least one computing device may implement a blockchain such as the primary blockchain. Further, the at least one computing device may include a smartphone, a smartwatch, a tablet, a personal computer (PC), a desktop, a laptop, and so on. Further, the communication device 202 may be configured for transmitting the notification to at least one user device 304, as shown in FIG. 3, associated with the IoT device 200. Further, the at least one user device 304 may be associated with at least one user. Further, the at least one user device 304 may include a computing device such as, but not limited to, a smartphone, a smartwatch, a tablet, a personal computer (PC), a desktop, a laptop, and so on. Further, in an embodiment, the communication device 202 may be further configured for receiving a response command from the at least one user device 304. Further, the response command may include at least one command action. Further, the at least one command action may be used to control at least one operation associated with the IoT device 200. Further, the IoT device 200, in an instance, may perform the at least one operation. Further, the processing device 204 may be further configured for changing an operational state of the IoT device 200 based on the response command. Further, the operational state, in an instance, may be associated with the at least one operation. Further, in an embodiment, the communication device 202 may be configured to transmit the operational state to the at least one user device 304. Further, in an embodiment, the IoT device 200 may further include at least one actuator 302, as shown in FIG. 3. Further, the at least one actuator 302 may be communicatively coupled with the communication device 202. Further, the at least one actuator 302 may be configured for changing the operational state of the IoT device 200. Further, the at least one actuator 302, in an instance, may include at least one drive mechanism. Further, at least one drive mechanism, in an instance, may be associated with the operational state. Further, the movement of the at least one drive mechanism through a plurality of positions may change the operational state. Further, the at least one actuator 302 may include a stepper motor, a hydraulic piston, etc. to provide the movement to the at least one drive mechanism. Further, in an embodiment, the communication device 202 may be further configured for transmitting security data may include at least one of actual operational data, standard operational data, the IoT data, the detection of the security event and the notification to a secondary blockchain device configured to store the security data on a secondary blockchain. Further, the security data may be used for monitoring the IoT device 200. Further, in an embodiment, the primary blockchain may include the secondary blockchain.

Further, the storage device 206 may be configured for storing at least the standard operational data. Further, the storage device 206, in an instance, may store the standard operational data in a database.

FIG. 3 is a block diagram of a system (IoT device) 200 configured for detecting a security event associated with an IoT device 200, in accordance with some embodiments.

Accordingly, the IoT device 200 may include the processing device 204, the communication device 202, and the storage device 206 as shown in FIG. 2. Further, the IoT device 200 may include at least one sensor 306, the at least one actuator 302, the at least one user device 304.

Further, in an embodiment, the IoT device 200, may further include at least one sensor 306 configured to generate at least one sensor data associated with the IoT device 200. Further, at least one sensor data may be associated with at least one of a state of the IoT device 200 and an environment of the IoT device 200. Further, the state may be associated with a plurality of configurations of a plurality of variables associated with at least one hardware of the IoT device 200. Further, the environment may be associated with a plurality of configurations of a plurality of variables associated with the surrounding of the IoT device 200. Further, the plurality of variables associated with the surrounding of the IoT device 200 may include meteorological parameters, physical objects, etc. Further, the meteorological parameters may include temperature, pressure, humidity, precipitation, etc. Further, the physical objects may include the presence of the physical objects, the movement of the physical objects, the position of the physical objects, etc. Further, the at least one sensor 306 may include a temperature sensor, a pressure sensor, a humidity sensor, a precipitation sensor, a motion sensor, a location sensor, etc.

Further, the at least one actuator 302 may be communicatively coupled with the communication device 202. Further, the at least one actuator 302 may be configured for changing the operational state of the IoT device 200. Further, the at least one actuator 302, in an instance, may include at least one drive mechanism. Further, at least one drive mechanism, in an instance, may be associated with the operational state. Further, the movement of the at least one drive mechanism through a plurality of positions may change the operational state. Further, the at least one actuator 302 may include a stepper motor, a hydraulic piston, etc. to provide the movement to the at least one drive mechanism.

Further, the at least one user device 304 may be associated with the at least one user. Further, the user device 304 may be configured to receive the notification from the communication device 202. Further, the at least one user device 304 may be configured to transmit the response command to the communication device 202. Further, the at least one user device 304 may be configured to receive the operational state. Further, the at least one user device 304 may include at least one trans-receiver. Further, the at least one user device 304 may include a computing device such as, but not limited to, a smartphone, a smartwatch, a tablet, a personal computer (PC), a desktop, a laptop, and so on.

Figure 4:
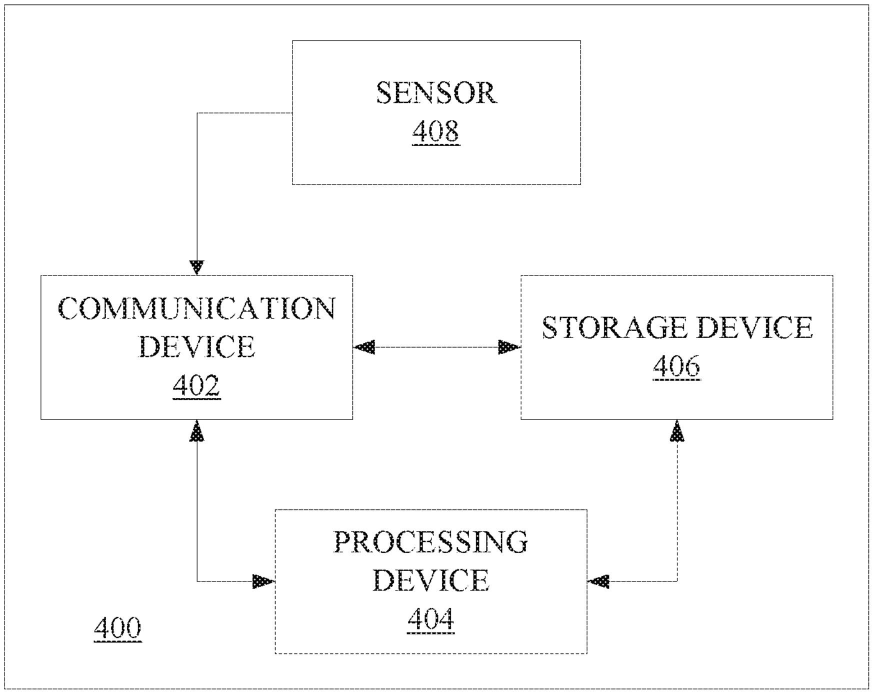
FIG. 4 is a block diagram of a system (IoT device) configured for detecting a security event associated with an IoT device, in accordance with some embodiments.

FIG. 4 is a block diagram of a system (IoT device) 400 configured for detecting a security event associated with an IoT device, in accordance with some embodiments. Accordingly, the IoT device 400 may include at least one sensor 408, a processing device 404, a communication device 402, and a storage device 406.

Further, the at least one sensor 408 configured to generate at least one state data corresponding to the IoT device 400. Further, the state data may include a plurality of configurations of a plurality of variables associated with at least one hardware component of the IoT device 400. Further, the plurality of variables associated with the at least one hardware component may include position variables, alignment variables, arrangement variables, location variables, etc. Further, the state data may include a plurality of configurations of a plurality of variables associated with an environment of the IoT device 400. Further, the plurality of variables associated with the environment may include temperature variables, pressure variables, humidity variables, etc. Further, the state data may include a plurality of configurations of a plurality of variables associated with at least one software component of the IoT device 400. Further, the at least one sensor 408 may include a location sensor, a motion sensor, a temperature sensor, a humidity sensor, a pressure sensor, etc.

Further, the processing device 404 may be communicatively coupled to the at least one sensor 408. Further, the processing device 404 may be configured for analyzing the at least one state data. Further, the analyzing, in an instance, may include at least one analyzing method. Further, the at least one analyzing method may be used to analyze the at least one state data. Further, the analyzing method may include comparing, interpreting, extrapolating, statistical analyzing, machine learning, etc. Further, the processing device 404 may be configured for detecting the security event based on analyzing. Further, the security event may correspond to at least one tampering activity associated with the IoT device. Further, the at least one tampering activity may include a breach, a malfunction, a malware, an unauthorized access, etc. Further, the at least one tampering activity may change the actual operation data associated with the actual operation of the IoT device. Further, the security event may include at least one of a discrepancy, an anomaly, an abnormality, etc. associated with each of the actual operational data with respect to the standard operational data. Further, the processing device 404 may be configured for generating a notification based on the detecting. Further, the notification, in an instance, may include the security event and particulars of the security event. Further, the particulars of the security event may include the time of the security event, the date of the security event, the severity of the security event, and so on.

Further, the communication device 402 configured for transmitting IoT data generated by the IoT device 400 to a primary blockchain device configured for storing the IoT data on a primary blockchain. Further, the IoT data may include any data that may be generated by the IoT device 400. Further, a blockchain device such as the primary blockchain device may include at least one computing device. Further, the at least one computing device may implement a blockchain such as the primary blockchain. Further, the at least one computing device may include a smartphone, a smartwatch, a tablet, a personal computer (PC), a desktop, a laptop, and so on. Further, the communication device 402 configured for transmitting the notification to at least one user device associated with the IoT device 400. Further, the user device may be associated with at least one user. Further, the at least one user device may be used to monitor the IoT device 400. Further, the at least one user device may include a computing device may include a smartphone, a smartwatch, a tablet, a personal computer (PC), a desktop, a laptop, and so on.

Further, the storage device 406 may be configured for storing the at least one state data. Further, the storage device 406 may store the at least one state data in the database.

Figure 5:
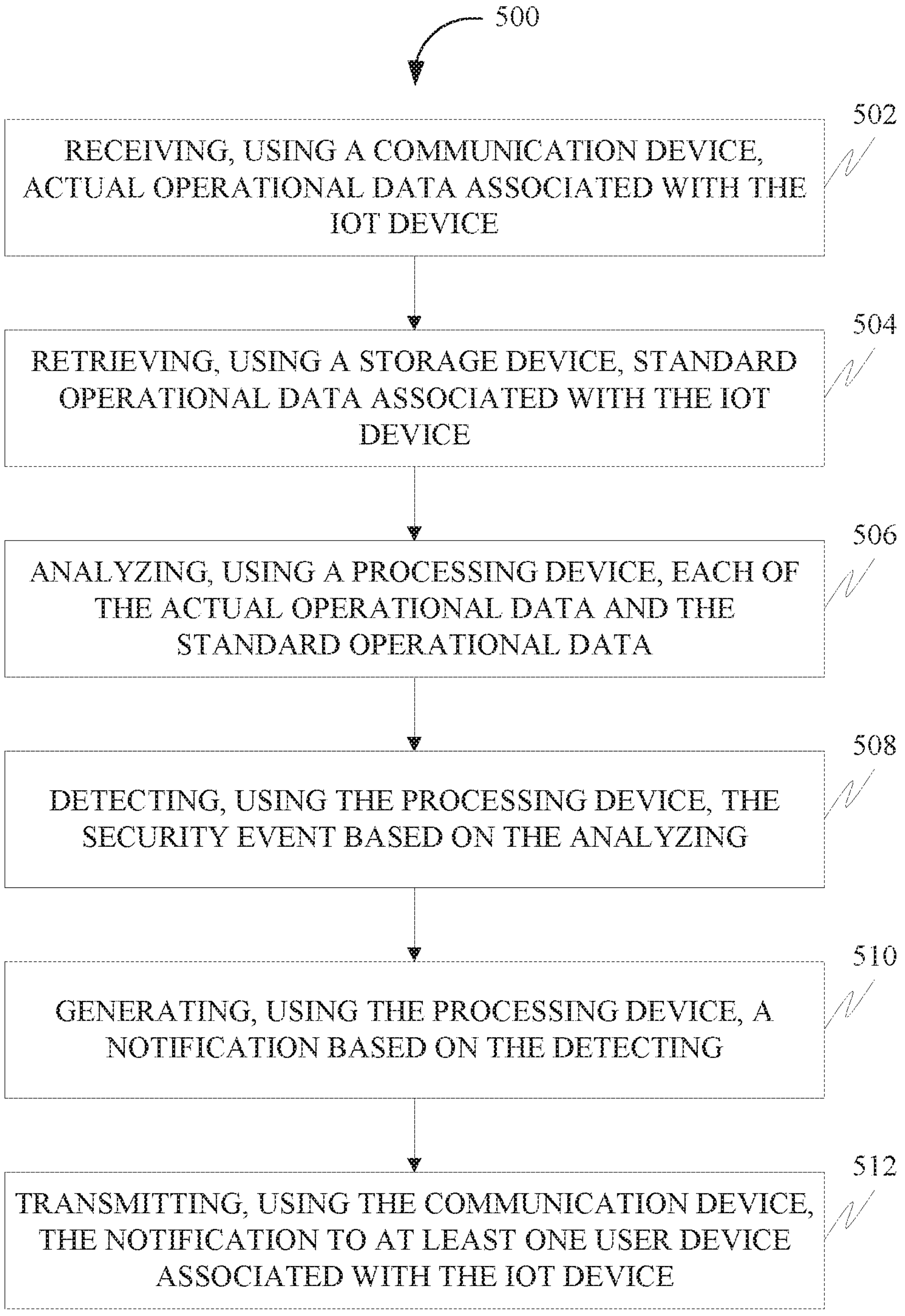
FIG. 5 is a flowchart of a method of detecting a security event associated with an IoT device configured to store data on a primary blockchain, in accordance with some embodiments.

FIG. 5 is a flowchart of a method 500 of detecting a security event associated with an IoT device configured to store data on a primary blockchain, in accordance with some embodiments. Accordingly, at 502 the method 500 may include a step of receiving, using a communication device, actual operational data associated with the IoT device. Further, the actual operational data, in an instance, may be associated with actual operation of the IoT device. Further, in an embodiment, the actual operational data may include at least one of actual hardware configuration data and actual software configuration data. Further, the actual hardware configuration data may include a plurality of values corresponding to a plurality of variables associated with an actual hardware configuration of the IoT device. Further, the actual software configuration data may include a plurality of values corresponding to a plurality of variables associated with an actual software configuration of the IoT device.

Further, at 504, the method 500 may include a step of retrieving, using a storage device, standard operational data associated with the IoT device. Further, the standard operational data, in an instance, may be associated with standard operation of the IoT device. Further, in an embodiment, the standard operational data may include at least one of standard hardware configuration data and standard software configuration data. Further, the standard hardware configuration data may include a plurality of values corresponding to a plurality of variables associated with a standard hardware configuration of the IoT device. Further, the standard software configuration data may include a plurality of values corresponding to a plurality of variables associated with a standard hardware configuration of the IoT device.

Further, at 506, the method 500 may include a step of analyzing, using a processing device, each of the actual operational data and the standard operational data. Further, the analyzing, in an instance, may include at least one analyzing method. Further, the analyzing method may include comparing, interpreting, extrapolating, statistical analyzing, machine learning, etc. Further, the analyzing method may be used to analyze each of the actual operation data with respect to the standard operational data.

Further, at 508, the method 500 may include a step of detecting, using the processing device, the security event based on the analyzing. Further, the security event may correspond to at least one tampering activity associated with the IoT device. Further, the at least one tampering activity may include a breach, a malware, a malfunction, an unauthorized access, etc. Further, the at least one tampering activity may change the actual operation data associated with the actual operation of the IoT device. Further, the security event may include at least one of a discrepancy, an anomaly, an abnormality, etc. associated with each of the actual operational data with respect to the standard operational data.

Further, at 510, the method 500 may include a step of generating, using the processing device, a notification based on the detecting. Further, the notification, in an instance, may include the security event and particulars of the security event. Further, the particulars of the security event may include the time of the security event, the date of the security event, the severity of the security event, and so on.

Further, at 512, the method 500 may include a step of transmitting, using the communication device, the notification to at least one user device associated with the IoT device. Further, the at least one user device may be associated with at least one user. Further, the at least one user device may include a computing device such as, but not limited to, a smartphone, a smartwatch, a laptop, a desktop, etc. Further, the at least one user may include an individual, an institution, an organization, etc. that may be associated with the IoT device.

Figure 6:
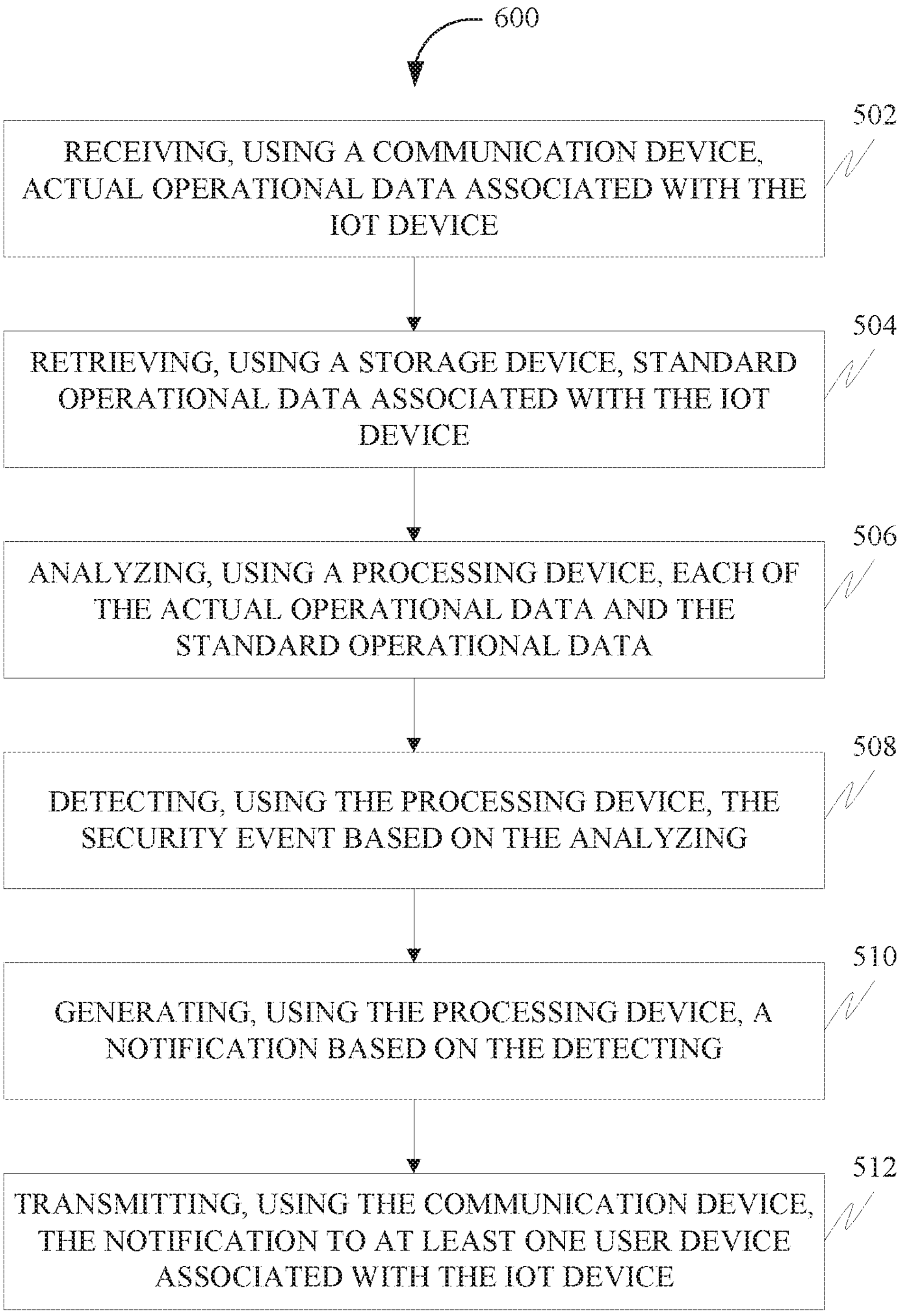
FIG. 6 is a partial flowchart of a method of detecting a security event associated with an IoT device configured to store data on a primary blockchain, in accordance with some embodiments.

FIG. 6 is a partial flowchart of a method 600 of detecting a security event associated with an IoT device configured to store data on a primary blockchain, in accordance with some embodiments. Further, step 502, 504, 506, 508, 510, and 512 of the method 500 may be described in FIG. 5.

Figure 7:
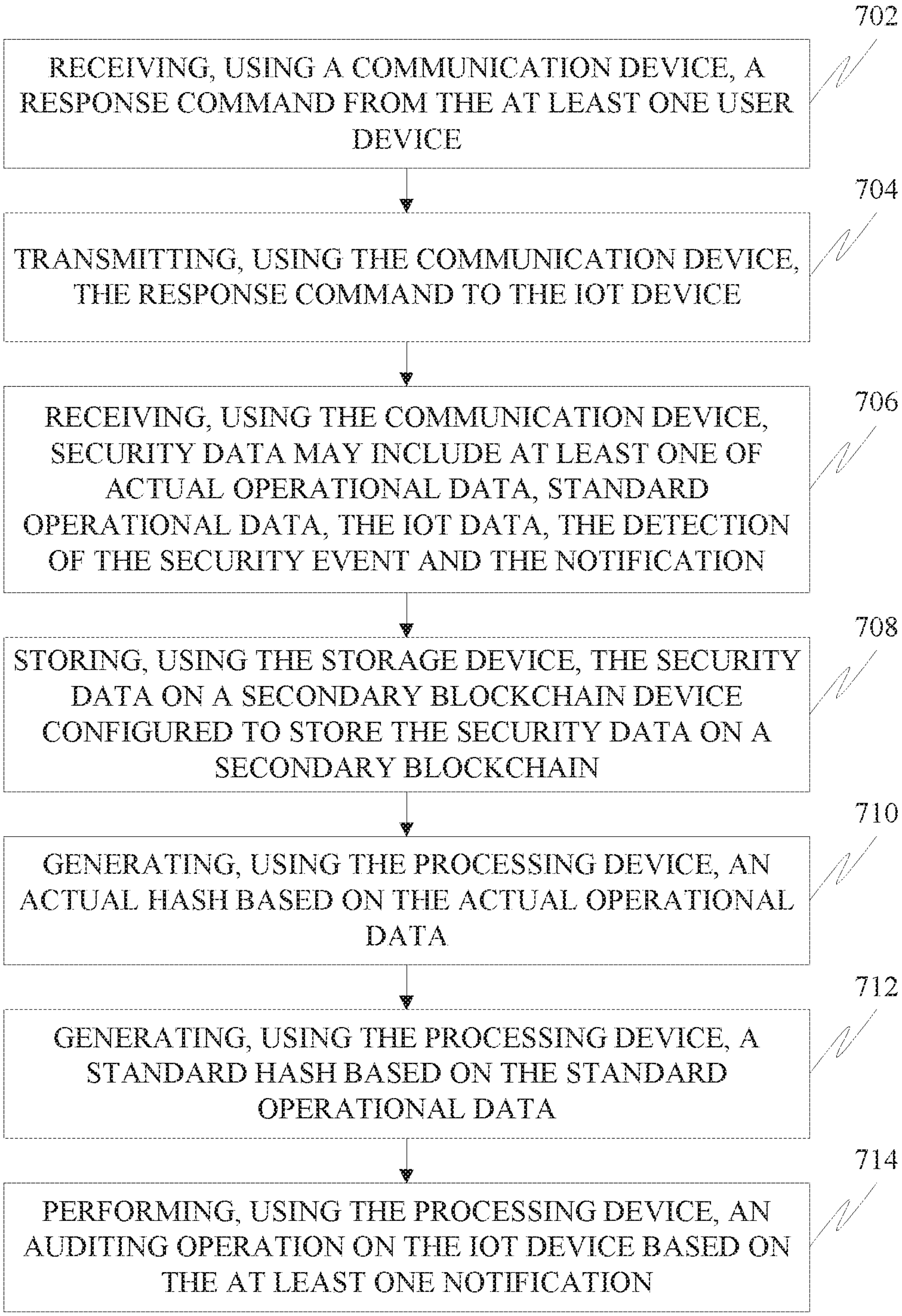
FIG. 7 is a partial flowchart of the method of detecting a security event associated with an IoT device configured to store data on a primary blockchain, in accordance with some embodiments.

FIG. 7 is a partial flowchart of the method 600 of detecting a security event associated with an IoT device configured to store data on a primary blockchain, in accordance with some embodiments. Further, at 702, the method 600 may include a step of receiving, using a communication device, a response command from the at least one user device. Further, the response command may include at least one command action. Further, the at least one command action may be used to control at least one operation associated with the IoT device. Further, the IoT device, in an instance, may perform the at least one operation. Further, the at least one user device may be associated with the at least one user.

Further, at 704, the method 600 may include a step of transmitting, using the communication device, the response command to the IoT device. Further, the IoT device may be configured for changing an operational state of the IoT device based on the response command. Further, the operational state, in an instance, may be associated with the at least one operation. Further, in an embodiment, the step may include transmitting, using the communication device, the operational state to the at least one user device. Further, in an embodiment, the IoT device may further include at least one actuator. Further, the at least one actuator may be configured for changing the operational state of the IoT device.

Further, at 706, the method 600 may include a step of receiving, using the communication device, security data. Further, the security data may include at least one of actual operational data, standard operational data, the IoT data, the detection of the security event and the notification. Further, the security data may be associated with the IoT device. Further, the security data may be used for monitoring the IoT device.

Further, at 708, the method 600 may include a step of storing, using the storage device, the security data on a secondary blockchain device may be configured to store the security data on a secondary blockchain. Further, in an embodiment, the primary blockchain may include the secondary blockchain. Further, a primary blockchain device may be configured to store IoT data on the primary blockchain. Further, the IoT data may include any data that may be generated by the IoT device. Further, a blockchain device, such as the secondary blockchain device, the primary blockchain device, etc. may include at least one computing device. Further, the at least one computing device may implement a blockchain, such as the secondary blockchain, the primary blockchain, etc. Further, the at least one computing device may include a smartphone, a smartwatch, a tablet, a personal computer (PC), a desktop, a laptop, and so on.

Further, at 710, the method 600 may include a step of generating, using the processing device, an actual hash based on the actual operational data. Further, the actual hash may be generated by using a hash algorithm. Further, the hash algorithm may be used to generate the actual hash based on the actual operational data. Further, the actual hash, in an instance, may represent the actual operational data.

Further, at 712, the method 600 may include a step of generating, using the processing device, a standard hash based on the standard operational data. Further, the standard hash may be generated by using the hash algorithm. Further, the hash algorithm may generate the standard hash based on the standard operational data. Further, the standard hash, in an instance, may represent the standard operational data. Further, the analyzing may include comparing the actual hash with the standard hash.

Further, at 714, the method 600 may include a step of performing, using the processing device, an auditing operation on the IoT device based on the at least one notification. Further, the auditing operation may include at least one corrective measure. Further, the at least one corrective measures may be used to resolve the at least one tampering activity associated with the IoT device.

Further, in an embodiment, the IoT device may further include at least one sensor. Further, the at least one sensor may be configured to generate at least one sensor data associated with the IoT device. Further, at least one sensor data may be associated with at least one of a state of the IoT device and an environment of the IoT device. Further, the actual operational data may include actual sensor data. Further, the standard operational data may include standard sensor data. Further, the state may be associated with a plurality of configurations of a plurality of variables associated with at least one hardware of the IoT device. Further, the environment may be associated with a plurality of configurations of a plurality of variables associated with the surrounding of the IoT device. Further, the plurality of variables associated with the surrounding of the IoT device may include meteorological parameters, object variables, etc. Further, the meteorological parameters may include temperature, pressure, humidity, precipitation, etc. Further, the physical objects may include the presence of the physical objects, the movement of physical objects, the position of physical objects, etc. Further, the at least one sensor may include a temperature sensor, a pressure sensor, a humidity sensor, a precipitation sensor, a motion sensor, a location sensor, etc.

Figure 8:
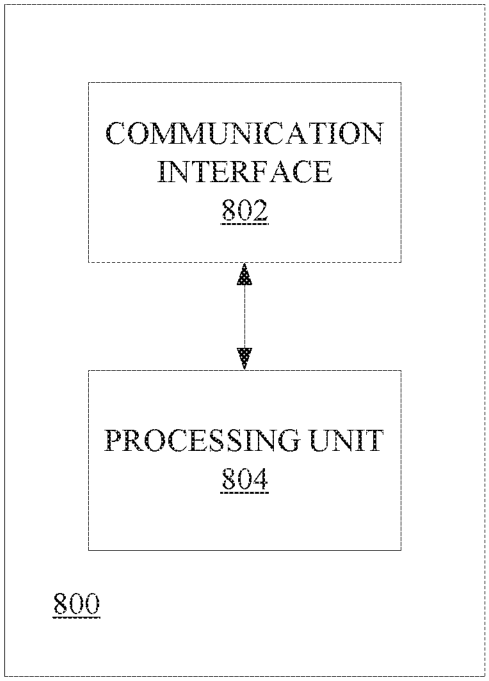
FIG. 8 is a block diagram of a semiconductor device configured for detecting a security event associated with an IoT device configured to store data on a primary blockchain, in accordance with some embodiments.

FIG. 8 is a block diagram of a semiconductor device 800 configured for detecting a security event associated with an IoT device configured to store data on a primary blockchain, in accordance with some embodiments. Accordingly, the semiconductor device 800 may include a communication interface 802 and a processing unit 804.

Further, the communication interface 802 may be configured to be communicatively coupled with at least one component of the IoT device. Further, the at least one component of the IoT device may include a processing device, a storage device, a communication device, a sensor, an actuator, etc. Further, the communication interface 802 may be configured for receiving actual operational data associated with the IoT device from the at least one component of the IoT device. Further, the actual operational data, in an instance, may be associated with actual operation of the IoT device. Further, in an embodiment, the actual operational data may include at least one of actual hardware configuration data and actual software configuration data. Further, the actual hardware configuration data may include a plurality of values corresponding to a plurality of variables associated with an actual hardware configuration of the IoT device. Further, the actual software configuration data may include a plurality of values corresponding to a plurality of variables associated with an actual software configuration of the IoT device. Further, the communication interface 802 may be configured for receiving standard operational data associated with the IoT device from the at least one component of the IoT device. Further, the standard operational data, in an instance, may be associated with standard operation of the IoT device. Further, in an embodiment, the standard operational data may include at least one of standard hardware configuration data and standard software configuration data. Further, the standard hardware configuration data may include a plurality of values corresponding to a plurality of variables associated with a standard hardware configuration of the IoT device. Further, the standard software configuration data may include a plurality of values corresponding to a plurality of variables associated with a standard hardware configuration of the IoT device. Further, the communication interface 802 may be configured for transmitting, a notification to the at least one component of the IoT device. Further, the notification, in an instance, may include the security event and particulars of the security event. Further, the particulars of the security event may include the time of the security event, the date of the security event, the severity of the security event, and so on.

Further, the processing unit 804 may be communicatively coupled with the communication interface 802. Further, the processing unit 804 may be configured for analyzing the actual operational data and the standard operational data. Further, the analyzing, in an instance, may include at least one analyzing method. Further, the analyzing method may include comparing, interpreting, extrapolating, statistical analyzing, machine learning, etc. Further, the analyzing method may be used to analyze the actual operation data with respect to the standard operational data. Further, the processing unit 804 may be configured for detecting the security event based on the analyzing. Further, the security event may correspond to at least one tampering activity associated with the IoT device. Further, the at least one tampering activity may include a breach, a malfunction, a malware, an unauthorized access, etc. Further, the at least one tampering activity may change the actual operation data associated with the actual operation of the IoT device. Further, the security event may include at least one of a discrepancy, an anomaly, an abnormality, etc. associated with each of the actual operational data with respect to the standard operational data. Further, the processing unit 804 may be configured for generating the notification based on the detecting.

Figure 9:
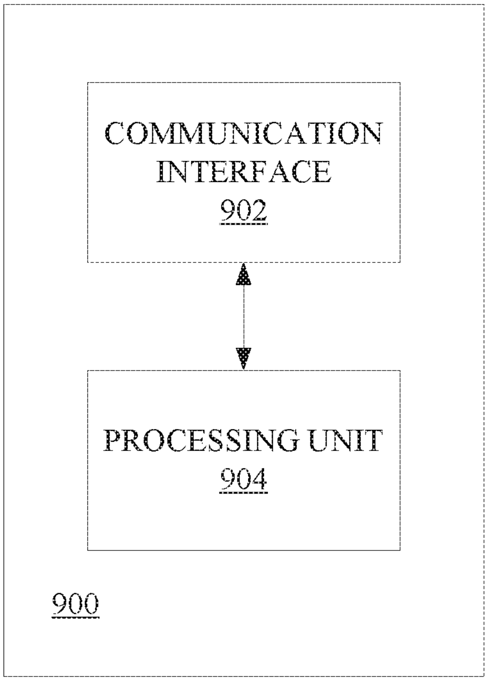
FIG. 9 is a block diagram of a dongle configured for detecting a security event associated with an IoT device configured to store IoT data on a primary blockchain, in accordance with some embodiments.

FIG. 9 is a block diagram of a dongle 900 configured for detecting a security event associated with an IoT device configured to store IoT data on a primary blockchain, in accordance with some embodiments. Further, the dongle 900 may be associated with an IoT device configured to store IoT data on a primary blockchain. Further, the dongle 900 may be configured to be communicatively coupled with the IoT device. Further, the dongle 900 may include a communication interface 902 and a processing unit 904.

Further, the communication interface 902 may be configured to be communicatively coupled with at least one component of the IoT device. Further, the at least one component of the IoT device may include a processing device, a storage device, a communication device, a sensor, an actuator, etc. Further, the communication interface 902 may be configured for receiving actual operational data associated with the IoT device from the at least one component of the IoT device. Further, the actual operational data, in an instance, may be associated with actual operation of the IoT device. Further, in an embodiment, the actual operational data may include at least one of actual hardware configuration data and actual software configuration data. Further, the actual hardware configuration data may include a plurality of values corresponding to a plurality of variables associated with an actual hardware configuration of the IoT device. Further, the actual software configuration data may include a plurality of values corresponding to a plurality of variables associated with an actual software configuration of the IoT device. Further, the communication interface 902 may be configured for receiving standard operational data associated with the IoT device from the at least one component of the IoT device. Further, the standard operational data, in an instance, may be associated with standard operation of the IoT device. Further, in an embodiment, the standard operational data may include at least one of standard hardware configuration data and standard software configuration data. Further, the standard hardware configuration data may include a plurality of values corresponding to a plurality of variables associated with a standard hardware configuration of the IoT device. Further, the standard software configuration data may include a plurality of values corresponding to a plurality of variables associated with a standard hardware configuration of the IoT device. Further, the communication interface 902 may be configured for transmitting, a notification to the at least one component of the IoT device. Further, the notification, in an instance, may include the security event and particulars of the security event. Further, the particulars of the security event may include the time of the security event, the date of the security event, the severity of the security event, and so on.

Further, the processing unit 904 may be communicatively coupled with the communication interface 902. Further, the processing unit 904 may be configured for analyzing the actual operational data and the standard operational data. Further, the analyzing, in an instance, may include at least one analyzing method. Further, the analyzing method may include comparing, interpreting, extrapolating, statistical analyzing, machine learning, etc. Further, the analyzing method may be used to analyze the actual operation data with respect to the standard operational data. Further, the processing unit 904 may be configured for detecting the security event based on the analyzing. Further, the security event may correspond to at least one tampering activity associated with the IoT device. Further, the at least one tampering activity may include a breach, a malfunction, a malware, an unauthorized access, etc. Further, the at least one tampering activity may change the actual operation data associated with the actual operation of the IoT device. Further, the security event may include at least one of a discrepancy, an anomaly, an abnormality, etc. associated with each of the actual operational data with respect to the standard operational data. Further, the processing unit 904 may be configured for generating the notification based on the detecting.

Figure 10:
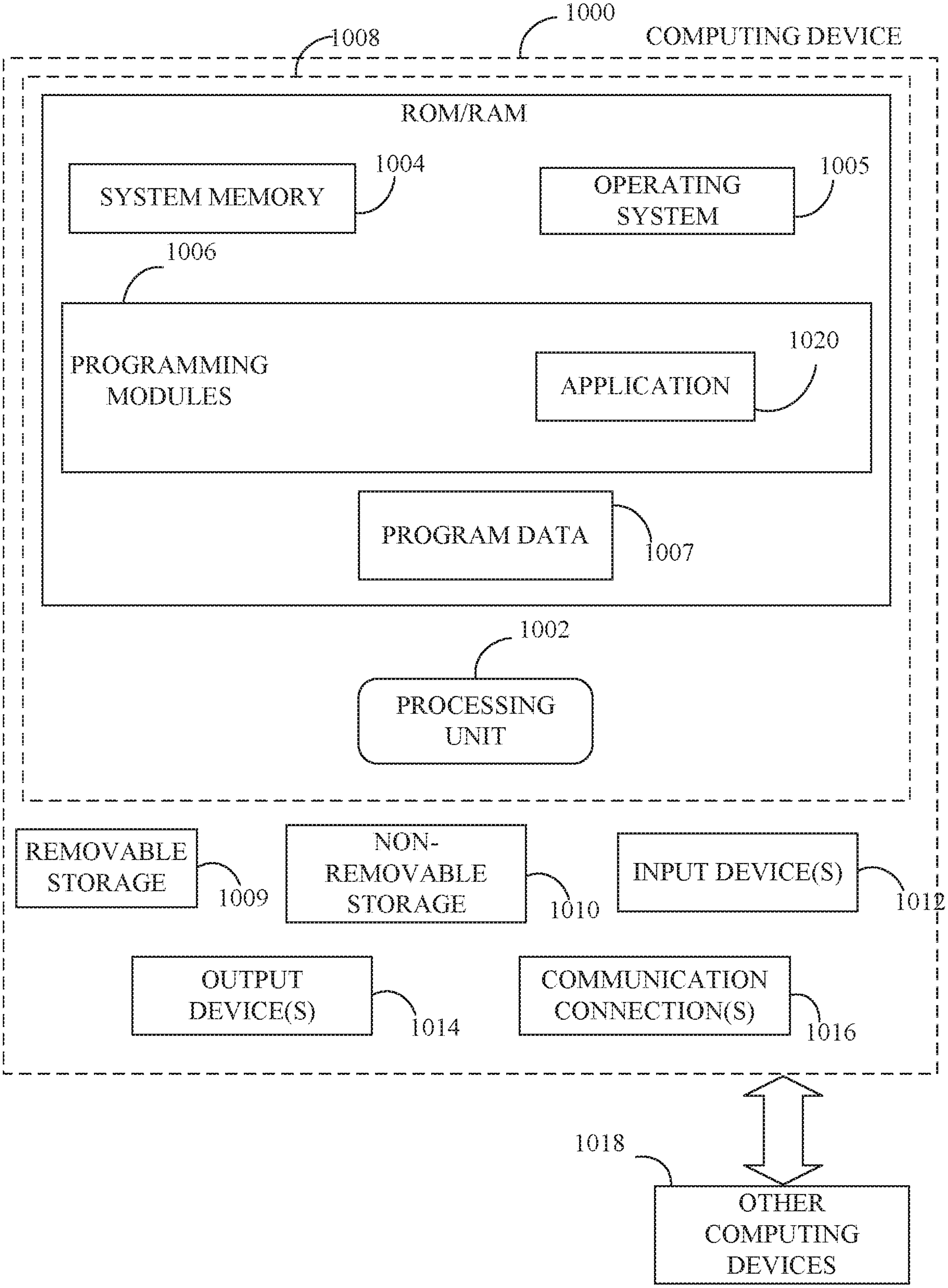
FIG. 10 is a block diagram of a computing device for implementing the methods disclosed herein, in accordance with some embodiments.

With reference to FIG. 10, a system consistent with an embodiment of the disclosure may include a computing device or cloud service, such as computing device 1000. In a basic configuration, computing device 1000 may include at least one processing unit 1002 and a system memory 1004. Depending on the configuration and type of computing device, system memory 1004 may comprise, but is not limited to, volatile (e.g. random-access memory (RAM)), non-volatile (e.g. read-only memory (ROM)), flash memory, or any combination. System memory 1004 may include operating system 1005, one or more programming modules 1006, and may include a program data 1007. Operating system 1005, for example, may be suitable for controlling computing device 1000's operation. In one embodiment, programming modules 1006 may include image-processing module, machine learning module. Furthermore, embodiments of the disclosure may be practiced in conjunction with a graphics library, other operating systems, or any other application program and is not limited to any particular application or system. This basic configuration is illustrated in FIG. 10 by those components within a dashed line 1008.

Computing device 1000 may have additional features or functionality. For example, computing device 1000 may also include additional data storage devices (removable and/or non-removable) such as, for example, magnetic disks, optical disks, or tape. Such additional storage is illustrated in FIG. 10 by a removable storage 1009 and a non-removable storage 1010. Computer storage media may include volatile and non-volatile, removable and non-removable media implemented in any method or technology for storage of information, such as computer-readable instructions, data structures, program modules, or other data. System memory 1004, removable storage 1009, and non-removable storage 1010 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1000. Any such computer storage media may be part of device 1000. Computing device 1000 may also have input device(s) 1012 such as a keyboard, a mouse, a pen, a sound input device, a touch input device, a location sensor, a camera, a biometric sensor, etc. Output device(s) 1014 such as a display, speakers, a printer, etc. may also be included. The aforementioned devices are examples and others may be used.

Computing device 1000 may also contain a communication connection 1016 that may allow device 1000 to communicate with other computing devices 1018, such as over a network in a distributed computing environment, for example, an intranet or the Internet. Communication connection 1016 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1004, including operating system 1005. While executing on processing unit 1002, programming modules 1006 (e.g., application 1020 such as a media player) may perform processes including, for example, one or more stages of methods, algorithms, systems, applications, servers, databases as described above. The aforementioned process is an example, and processing unit 1002 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like.

Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

We claim:

1. An Internet of Things (IoT) device configured for detecting a security event, wherein the IoT device is connected to a blockchain network, wherein the IoT device is a node of the blockchain network, wherein the IoT device comprises circuit utilizing a microprocessor, wherein the IoT device writes a unique key of the IoT device as a part of each entry into a ledger of the blockchain network, wherein the IoT device comprising:

a processor configured for:

receiving actual operational data associated with the IoT device;

receiving standard operational data associated with the IoT device;

generating an actual hash based on the actual operational data, wherein the actual operational data comprises an actual hardware configuration data, an actual software configuration data, and at least one sensor data, wherein the at least one sensor data is associated with an environment of the IoT device, wherein the actual hardware configuration data comprises a plurality of values corresponding to a plurality of variables associated with at least one hardware component of the IoT device, wherein the plurality of variables comprises at least one of a position variable, an alignment variable, an arrangement variable, and a location variable of the at least one hardware component;

generating a standard hash based on the standard operational data;

analyzing the actual operational data and the standard operational data, wherein the analyzing of the actual operational data and the standard operational data comprises comparing the actual hash and the standard hash;

detecting the security event comprising a tampering done to the IoT device based on the analyzing;

altering the unique key of the IoT device based on the tampering of the IoT device, wherein at least one of a plurality of nodes of the blockchain network identifies a mismatch between the unique key in the ledger and an expected unique key, wherein the mismatch is indicative of the tampering done to the IoT device, wherein the IoT device is flagged based on the identification of the mismatch; and excluding the IoT device from the blockchain network based on the security event, wherein each of the plurality of nodes of the blockchain network has a master list comprising a list of a plurality of IoT devices and a plurality of corresponding unique keys, wherein the identification of the mismatch of the unique key of the IoT device informs the tampering of the IoT device to the plurality of nodes, wherein at least one of the plurality of nodes blacklists the IoT device from submitting information to the blockchain network upon the exclusion, wherein the IoT device remains excluded from the blockchain network until working of the IoT device is verified and the IoT device is recalibrated after the working of the IoT device is verified, wherein at least one of the plurality of nodes accepts the IoT device back into the blockchain network after the working of the IoT device is verified and the IoT device is recalibrated.

2. The IoT device of claim 1 further comprising a network interface, wherein the network interface is configured for receiving a response command from at least one user device, wherein the processor is further configured for changing an operational state of the IoT device based on the response command.

3. The IoT device of claim 2, wherein the network interface is configured to transmit the operational state to the at least one user device.

4. The IoT device of claim 2 further comprising at least one actuator, wherein the at least one actuator is communicatively coupled with the network interface, wherein the at least one actuator is configured for changing the operational state of the IoT device.

5. The IoT device of claim 1 further comprising:

a network interface, wherein the network interface is configured for:

transmitting Internet of Things (IoT) data generated by the IoT device to a primary blockchain device, wherein the primary blockchain device is configured to store the IoT data on a primary blockchain;

transmitting a notification comprising the security event to at least one user device associated with the IoT device; and transmitting security data comprising at least one of the actual operational data, the standard operational data, Internet of Things (IoT) data, the security event, and the notification to a secondary blockchain device configured to store the security data on a secondary blockchain, wherein the secondary blockchain device is a blockchain device comprising at least one circuit utilizing the microprocessor, wherein the at least one circuit utilizing the microprocessor implements a blockchain, wherein the processor is further configured for generating the notification based on the detecting; and a system memory configured for storing the standard operational data.

6. The IoT device of claim 5, wherein the IoT device stores the IoT data on the primary blockchain associated with the blockchain network, wherein the primary blockchain comprises the secondary blockchain.

7. A method of detecting a security event associated with an Internet of Things (IoT) device, wherein the IoT device is connected to a blockchain network, wherein the IoT device is a node of the blockchain network, wherein the IoT device comprises a circuit utilizing a microprocessor, wherein the IoT device writes a unique key of the IoT device as a part of each entry into a ledger of the blockchain network, wherein the method comprises:

receiving, using a network interface, actual operational data associated with the IoT device;

retrieving, using a system memory, standard operational data associated with the IoT device;

generating, using a processor, an actual hash based on the actual operational data, wherein the actual operational data comprises an actual hardware configuration data, an actual software configuration data, and at least one sensor data, wherein the at least one sensor data is associated with an environment of the IoT device, wherein the actual hardware configuration data comprises a plurality of values corresponding to a plurality of variables associated with at least one hardware component of the IoT device, wherein the plurality of variables comprises at least one of a position variable, an alignment variable, an arrangement variable, and a location variable of the at least one hardware component;

generating, using the processor, a standard hash based on the standard operational data;

analyzing, using the processor, each of the actual operational data and the standard operational data, wherein the analyzing of the actual operational data and the standard operational data comprises comparing the actual hash and the standard hash;

detecting, using the processor, the security event comprising a tampering done to the IoT device based on the analyzing;

altering, using the processor, the unique key of the IoT device based on the tampering of the IoT device, wherein at least one of a plurality of nodes of the blockchain network identifies a mismatch between the unique key in the ledger and an expected unique key, wherein the mismatch is indicative of the tampering done to the IoT device, wherein the IoT device is flagged based on the identification of the mismatch; and excluding, using the processor, the IoT device from the blockchain network based on the security event, wherein each of the plurality of nodes of the blockchain network has a master list comprising a list of a plurality of IoT devices and a plurality of corresponding unique keys, wherein the identification of the mismatch of the unique key of the IoT device informs the tampering of the IoT device to the plurality of nodes, wherein at least one of the plurality of nodes blacklists the IoT device from submitting information to the blockchain network upon the exclusion, wherein the IoT device remains excluded from the blockchain network until working of the IoT device is verified and the IoT device is recalibrated after the working of the IoT device is verified, wherein at least one of the plurality of nodes accepts the IoT device back into the blockchain network after the working of the IoT device is verified and the IoT device is recalibrated.

8. The method of claim 7 further comprising:

receiving, using the network interface, a response command from at least one user device; and transmitting, using the network interface, the response command to the IoT device, wherein the IoT device is configured for changing an operational state of the IoT device based on the response command.

9. The method of claim 8 further comprising transmitting, using the network interface, the operational state to the at least one user device.

10. The method of claim 8, wherein the IoT device further comprises at least one actuator, wherein the at least one actuator is configured for changing the operational state of the IoT device.

11. The method of claim 7 further comprising:

transmitting, using the network interface, Internet of Things (IoT) data generated by the IoT device to a primary blockchain device, wherein the primary blockchain device is configured to store the IoT data on a primary blockchain;

generating, using the processor, a notification comprising the security event based on the detecting;

transmitting, using the network interface, the notification to at least one user device associated with the IoT device;

receiving, using the network interface, security data comprising at least one of the actual operational data, the standard operational data, Internet of Things (IoT) data, the security event and the notification; and storing, using the system memory, the security data on a secondary blockchain device configured to store the security data on a secondary blockchain.

12. The method of claim 11, wherein the IoT device stores the IoT data on the primary blockchain associated with the blockchain network, wherein the primary blockchain comprises the secondary blockchain.

13. The method of claim 7 further comprising:

performing, using the processor, an auditing operation on the IoT device based on at least one notification, wherein the auditing operation comprises at least one corrective measure, wherein the at least one corrective measure resolves a tampering activity associated with the IoT device, wherein the security event comprises the tampering activity; and receiving, using the network interface, a verification of the IoT device from the at least one user device after a third party verifies the working of the IoT device, and recalibrates the IoT device for making the IoT device acceptable into the blockchain network after the excluding of the IoT device from the blockchain network based on the security event, wherein the IoT device is accepted in the blockchain network based on the verification after the excluding of the IoT device.

14. A semiconductor device configured for detecting a security event associated with an Internet of Things (IoT) device, wherein the IoT device is connected to a blockchain network, wherein the IoT device is a node of the blockchain network, wherein the IoT device comprises a circuit utilizing a microprocessor, wherein the IoT device writes a unique key of the IoT device as a part of each entry into a ledger of the blockchain network, wherein the semiconductor device comprises:

a communication interface configured to be communicatively coupled with at least one component of the IoT device, wherein the communication interface is configured for:

receiving actual operational data associated with the IoT device from the at least one component of the IoT device; and receiving standard operational data associated with the IoT device from the at least one component of the IoT device; and a processor communicatively coupled with the communication interface, wherein the processor is configured for:

generating an actual hash based on the actual operational data, wherein the actual operational data comprises an actual hardware configuration data, an actual software configuration data, and at least one sensor data, wherein the at least one sensor data is associated with an environment of the IoT device, wherein the actual hardware configuration data comprises a plurality of values corresponding to a plurality of variables associated with at least one hardware component of the IoT device, wherein the plurality of variables comprises at least one of a position variable, an alignment variable, an arrangement variable, and a location variable of the at least one hardware component;

generating a standard hash based on the standard operational data;

analyzing the actual operational data and the standard operational data, wherein the analyzing of the actual operational data and the standard operational data comprises comparing the actual hash and the standard hash;

detecting the security event comprising a tampering done to the IoT device based on the analyzing;

altering the unique key of the IoT device based on the tampering of the IoT device, wherein at least one of a plurality of nodes of the blockchain network identifies a mismatch between the unique key in the ledger and an expected unique key, wherein the mismatch is indicative of the tampering done to the IoT device, wherein the IoT device is flagged based on the identification of the mismatch; and excluding the IoT device from the blockchain network based on the security event, wherein each of the plurality of nodes of the blockchain network has a master list comprising a list of a plurality of IoT devices and a plurality of corresponding unique keys, wherein the identification of the mismatch of the unique key of the IoT device informs the tampering of the IoT device to the plurality of nodes, wherein at least one of the plurality of nodes blacklists the IoT device from submitting information to the blockchain network upon the exclusion, wherein the IoT device remains excluded from the blockchain network until working of the IoT device is verified and the IoT device is recalibrated after the working of the IoT device is verified, wherein at least one of the plurality of nodes accepts the IoT device back into the blockchain network after the working of the IoT device is verified and the IoT device is recalibrated.

15. A dongle configured for detecting a security event associated with an Internet of Things (IoT) device, wherein the IoT device is connected to a blockchain network, wherein the dongle is configured to be communicatively coupled with the IoT device, wherein the IoT device is a node of the blockchain network, wherein the IoT device comprises a circuit utilizing a microprocessor, wherein the IoT device writes a unique key of the IoT device as a part of each entry into a ledger of the blockchain network, wherein the dongle comprises:

a communication interface configured to be communicatively coupled with at least one component of the IoT device, wherein the communication interface is configured for:

receiving actual operational data associated with the IoT device from the at least one component of the IoT device; and receiving standard operational data associated with the IoT device from the at least one component of the IoT device; and a processor communicatively coupled with the communication interface, wherein the processor is configured for:

generating an actual hash based on the actual operational data, wherein the actual operational data comprises an actual hardware configuration data, an actual software configuration data, and at least one sensor data, wherein the at least one sensor data is associated with an environment of the IoT device, wherein the actual hardware configuration data comprises a plurality of values corresponding to a plurality of variables associated with at least one hardware component of the IoT device, wherein the plurality of variables comprises at least one of a position variable, an alignment variable, an arrangement variable, and a location variable of the at least one hardware component;

generating a standard hash based on the standard operational data;

analyzing the actual operational data and the standard operational data, wherein the analyzing of the actual operational data and the standard operational data comprises comparing the actual hash and the standard hash;

detecting the security event comprising a tampering done to the IoT device based on the analyzing;

altering the unique key of the IoT device based on the tampering of the IoT device, wherein at least one of a plurality of nodes of the blockchain network identifies a mismatch between the unique key in the ledger and an expected unique key, wherein the mismatch is indicative of the tampering done to the IoT device, wherein the IoT device is flagged based on the identification of the mismatch; and excluding the IoT device from the blockchain network based on the security event, wherein each of the plurality of nodes of the blockchain network has a master list comprising a list of a plurality of IoT devices and a plurality of corresponding unique keys, wherein the identification of the mismatch of the unique key of the IoT device informs the tampering of the IoT device to the plurality of nodes, wherein at least one of the plurality of nodes blacklists the IoT device from submitting information to the blockchain network upon the exclusion, wherein the IoT device remains excluded from the blockchain network until working of the IoT device is verified and the IoT device is recalibrated after the working of the IoT device is verified, wherein at least one of the plurality of nodes accepts the IoT device back into the blockchain network after the working of the IoT device is verified and the IoT device is recalibrated.

* * * * *